United States Patent
Célérier et al.

(10) Patent No.: US 12,208,554 B2
(45) Date of Patent: Jan. 28, 2025

(54) METHOD FOR MARKING A DECORATIVE ARTICLE

(71) Applicant: The Swatch Group Research and Development Ltd, Marin (CH)

(72) Inventors: Yannick Célérier, Aluze (FR); Benoît Lafin, Saint-Christophe-en-Bresse (FR); Catherine Blanc Petiot, Saint-Marcel (FR); Claire Rannoux, Geneva (CH); Nicolas Francois, Neuchatel (CH)

(73) Assignee: The Swatch Group Research and Development Ltd, Marin (CH)

( * ) Notice: Subject to any disclaimer, the term of this patent is extended or adjusted under 35 U.S.C. 154(b) by 497 days.

(21) Appl. No.: 17/065,665

(22) Filed: Oct. 8, 2020

(65) Prior Publication Data
US 2021/0170659 A1    Jun. 10, 2021

(30) Foreign Application Priority Data

Dec. 4, 2019 (EP) .................................. 19213621

(51) Int. Cl.
  *B29C 48/00* (2019.01)
  *A44C 27/00* (2006.01)
  (Continued)

(52) U.S. Cl.
  CPC ............ *B29C 48/002* (2019.02); *A44C 27/00* (2013.01); *B29C 48/9135* (2019.02);
  (Continued)

(58) Field of Classification Search
  CPC ..... A44C 27/00; A44C 27/001; B44B 5/0047; B29L 2031/722; B29L 2007/007;
  (Continued)

(56) References Cited

U.S. PATENT DOCUMENTS

| | | | | |
|---|---|---|---|---|
| 2,821,746 A | * | 2/1958 | Bicher, Jr. | .............. B29C 48/08 264/177.17 |
| 3,920,372 A | * | 11/1975 | Katagi | .................... B29C 67/00 425/319 |

(Continued)

FOREIGN PATENT DOCUMENTS

| | | | |
|---|---|---|---|
| CN | 1155732 A | | 7/1997 |
| CN | 103057094 | * | 4/2013 |

(Continued)

OTHER PUBLICATIONS

Combined Chinese Office Action and Search Report issued Jun. 15, 2022 in Chinese Patent Application No. 202011094520.5 (with English translation), 15 pages.

(Continued)

*Primary Examiner* — Jeffrey M Wollschlager
(74) *Attorney, Agent, or Firm* — Oblon, McClelland, Maier & Neustadt, L.L.P.

(57) ABSTRACT

An in-line method for marking a substrate made of extruded synthetic material, the method including the steps of extruding the synthetic material through an extrusion die to form the substrate, marking the substrate by scrolling the substrate obtained from the extrusion die between two rotatably mounted and temperature-controlled rollers with an upper roller and a lower roller, one of the rollers having an impression forming the negative of a decoration or a texture to be marked on one face of the substrate, this same roller or the other of the rollers including at least one notch allowing to guide the substrate as it passes through the extrusion die and between the two rollers. An installation can include in line the extrusion die and the marking device.

16 Claims, 2 Drawing Sheets

(51) Int. Cl.
  *B29C 48/88* (2019.01)
  *B29C 59/04* (2006.01)
  *B29L 31/00* (2006.01)
  *B44B 5/00* (2006.01)
(52) U.S. Cl.
  CPC .......... *B29C 59/043* (2013.01); *B44B 5/0047* (2013.01); *B29L 2031/722* (2013.01); *B29L 2031/743* (2013.01)
(58) Field of Classification Search
  CPC ......... B29L 2031/739; B29L 2031/743; B29K 2021/003; B44C 1/24; B29C 48/885; B29C 2793/0045; B29C 59/043; B29C 59/04
  See application file for complete search history.

(56) References Cited

U.S. PATENT DOCUMENTS

| | | | |
|---|---|---|---|
| 4,234,657 A | | 11/1980 | Bussey, Jr. |
| 5,478,516 A | | 12/1995 | Malm et al. |
| 10,035,289 B2 | * | 7/2018 | Tokita ................... B29C 48/12 |
| 2016/0009011 A1 | * | 1/2016 | He ....................... G02B 6/0065 425/224 |
| 2017/0120502 A1 | | 5/2017 | Lin |
| 2019/0022912 A1 | * | 1/2019 | Rannoux ............... B29C 48/17 |

FOREIGN PATENT DOCUMENTS

| | | | |
|---|---|---|---|
| CN | 103057094 A | | 4/2013 |
| CN | 105965905 A | | 9/2016 |
| CN | 108430733 A | | 8/2018 |
| EP | 0711651 | * | 5/1996 |
| EP | 3 162 535 A1 | | 5/2017 |
| EP | 3 189 954 A1 | | 7/2017 |
| EP | 3 311 976 A1 | | 4/2018 |
| JP | 53-25670 A | | 3/1978 |
| JP | 55-46929 A | | 4/1980 |
| JP | 06-044616 A | | 2/1994 |
| KR | 10-2017-0047121 A | | 5/2017 |
| WO | WO 2017/118678 A1 | | 7/2017 |

OTHER PUBLICATIONS

European Search Report issued Jun. 22, 2020 in European Application 19213621.6 filed on Dec. 4, 2019 (with English Translation of Categories of Cited Documents & Written Opinion), 10 pages.
Japanese Office Action issued Sep. 21, 2021 in Japanese Patent Application No. 2020-162920 (with English translation), 8 pages.

* cited by examiner

A-A

A-A

A-A

METHOD FOR MARKING A DECORATIVE ARTICLE

CROSS-REFERENCE TO RELATED APPLICATION

This application claims priority to European Patent Application No. 19213621.6 filed on Dec. 4, 2019, the entire disclosure of which is hereby incorporated herein by reference.

TECHNICAL FIELD

The present invention relates to a method for in-line marking of a synthetic material substrate directly obtained from an extrusion die.

TECHNOLOGICAL BACKGROUND

To mark plastics, several methods are known and used. Mention can be made of embossing, laser engraving or else traditional printing methods.

Laser engraving is the most widely described method for marking plastics. It has several advantages such as durability and flexibility of the pattern to be engraved. In contrast, the equipment is very expensive and most importantly most plastics cannot be marked effectively without the use of laser-sensitive additives. The selection of additives and the type of laser is not easy and requires a significant number of tests for each plastic formulation.

The inkjet and digital printing methods are compatible with an in-line profile customisation and allow the printing of various patterns. On the other hand, the marking wears out over time and is therefore not permanent.

Embossing involves passing the molten material between heated rollers to manufacture a flat film, the latter then passes between rollers engraved with a pattern. This method described, for example, in document U.S. Pat. No. 4,744,936 thus only allows obtaining marked films having a constant thickness. It is not adapted for marking complex shaped profiles with variable thicknesses such as in the case of watch wristlets.

SUMMARY OF THE INVENTION

To overcome the aforementioned disadvantages, the present invention provides a new marking method which allows to engrave both simple-shaped substrates and complex-shaped substrates, which allows to carry out permanent marking while being inexpensive. This method can be advantageously used to decorate, customise or else carry out an anti-counterfeiting marking on a profile made of synthetic material.

More specifically, the method according to the invention is an in-line method for marking a substrate made of extruded synthetic material, comprising the steps of:
Extruding the synthetic material through an extrusion die to form the substrate,
Marking said substrate by scrolling the substrate obtained from the extrusion die between two rotatably mounted and temperature-controlled rollers with an upper roller and a lower roller, one of said rollers having an impression forming the negative of a decoration or a texture to be marked on one face of the substrate, this same roller or the other of said rollers including at least one notch allowing to guide the substrate as it passes through the extrusion die and between the two rollers.

Preferably, the notch is intended to receive the substrate over its entire width.

According to one variant, the notch is intended to receive a portion of the width of the substrate. For example, this portion may consist of a relief present at the end of the extrusion method and intended to be housed in the notch of complementary shape.

Advantageously, the method according to the invention includes a forced cooling step between the extrusion step and the marking step so as to fix the profile of the extruded substrate while maintaining a certain deformability of the material so as to allow its marking.

After marking, the substrate is sized using a mechanical stamping tool, by water jet, laser or ultrasound cutting to obtain the desired decorative article.

This marking method has the advantage of being in line with the extrusion method, which allows to mask the marking time and therefore to reduce the cost.

The general profile of the substrate is not modified during marking, which allows the dimensions of the profile resulting from the extrusion to be preserved and any type of profile to be marked.

An infinite number of patterns and textures are achievable via this method, including micrometric textures to avoid counterfeiting. Furthermore, the marking obtained thanks to this method does not deteriorate over time. It is moreover very fine and precise.

Compared to an injection method, this method combining extrusion and marking has several advantages:
It is an in-line method, that is to say a method which allows high productivity compared to a batch method such as that of injection.
The customisation of the pattern or the texture is done at a lower cost because the investment for a pair of rollers is significantly less than for an injection mould.

The present invention also relates to the installation comprising in line the extrusion die and the marking device.

BRIEF DESCRIPTION OF THE FIGURES

The invention will be described in more detail below using the appended drawings, given as non-limiting examples, wherein.

DETAILED DESCRIPTION OF THE INVENTION

The present invention relates to a method for marking a substrate resulting from an extrusion method. The marking method according to the invention allows to engrave synthetic profiles in-line in order to obtain various patterns and/or surface texturing. The method is more specifically described for the marking of a watch or jewellery external part and in particular for the marking of a wristlet of a watch or a piece of jewellery. It can however be applied to the marking of any extruded substrate in order to produce a decorative article.

Figure 1:
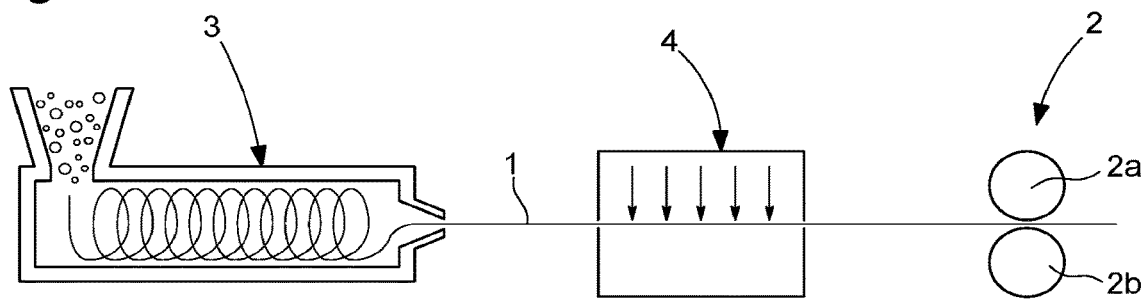
FIG. 1 schematically shows the continuous line for manufacturing decorative articles including the extrusion die and the marking device separated by cooling means.

According to the present invention, the marking is carried out on a synthetic substrate 1 using a marking device 2 which is in line with an extrusion die 3 as schematised in FIG. 1. Preferably, the installation includes between the output of the extrusion die 3 and the marking device 2, cooling means 4 such as a water tank or a tunnel provided with an air jet which allow the substrate to be slightly cooled after extrusion so as to freeze the profile. The installation also includes after the marking device cutting means (not shown): water jet, ultrasound, laser or else a mechanical stamping tool to lead to the final object.

The marking device 2 includes two rotatably mounted and temperature-controlled rollers 2a, 2b. According to the invention, one of the rollers, the upper roller 2a in the example illustrated in FIGS. 2a and 2b, includes a raised and/or recessed impression 5 representing a pattern (letters, numbers, drawings, etc.) or a texture intended to produce the marking 8 on one face of the substrate 1. According to the invention, this same roller 2a or the other roller 2b includes at least one notch 6 extending over the entire circumference of the roller. This notch allows to guide the substrate during extrusion and marking. Different configurations for the positioning and the size of the notches are possible.

Figure 2A:
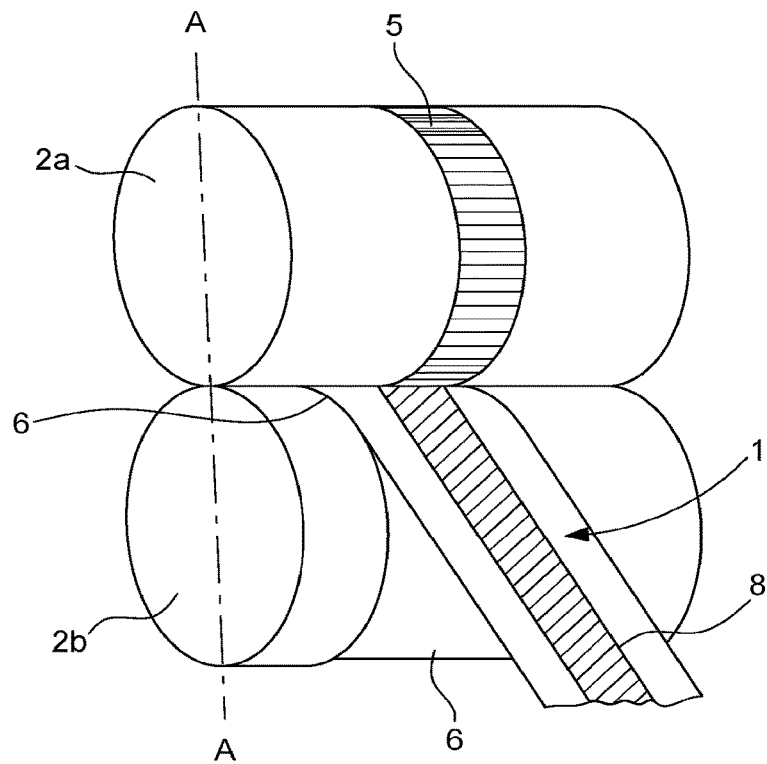
FIG. 2a shows in a three-dimensional view the marking device provided with an embossing roller and a backing roller including a notch according to the invention.
Figure 2B:
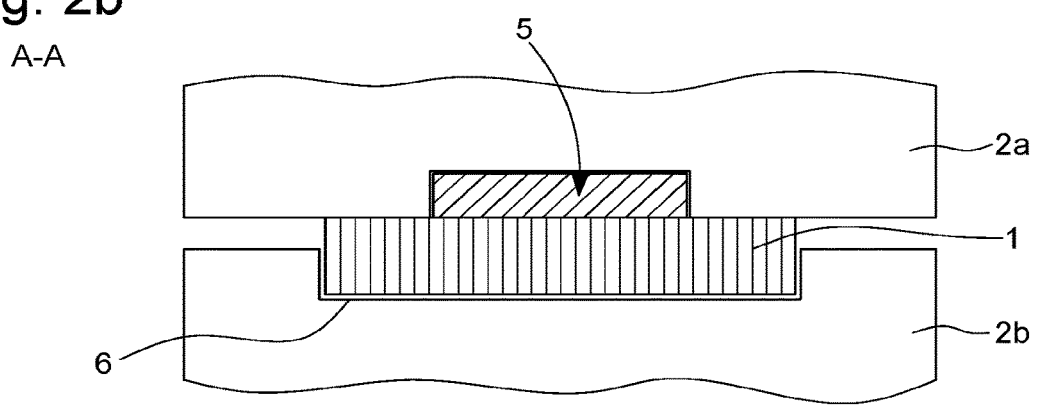
FIG. 2b shows a partial sectional view along the plane A-A.

According to the preferred variant shown in FIGS. 2a and 2b, the roller 2b opposite to that 2a including the impression 5 includes a notch 6 which has the width of the extruded strip 1. This notch has a depth less than or equal to the maximum thickness of the extruded strip. It is also considerable that its depth is greater than the thickness of the strip if the impression on the opposite roller is raised.

Figure 3:
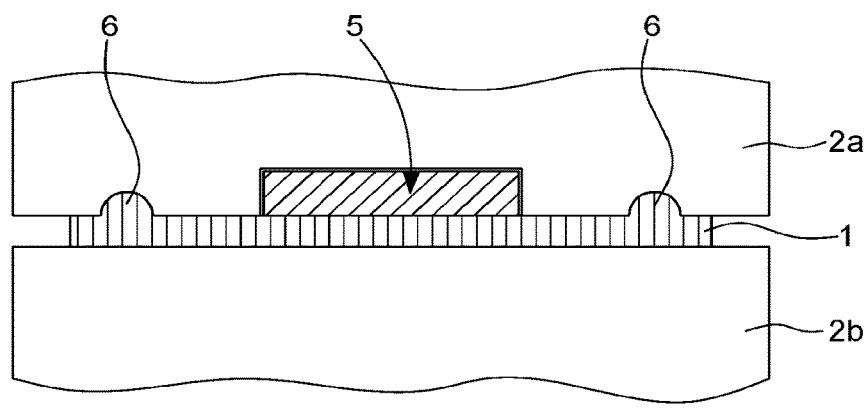
FIG. 3 shows a partial sectional view along the same plane A-A of a variant of the marking device.
Figure 4:
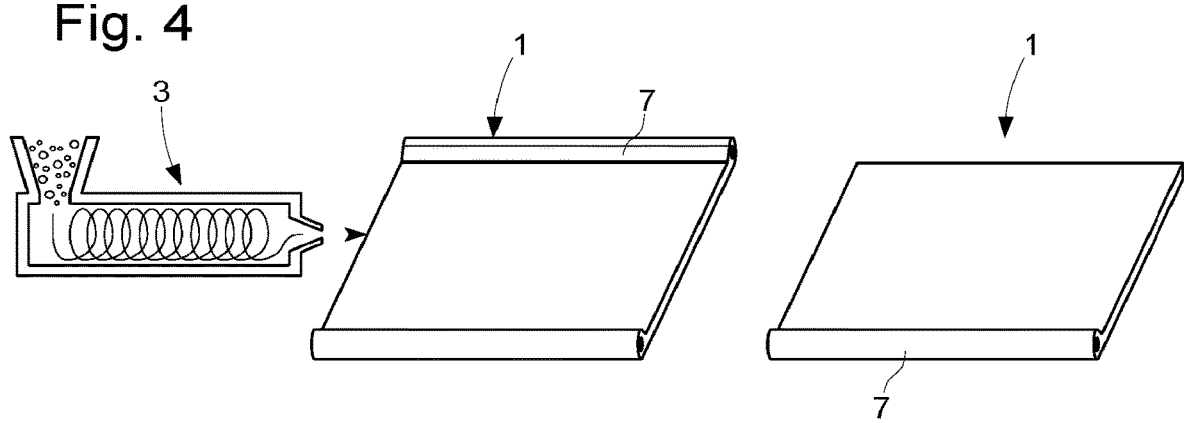
FIG. 4 shows a perspective view of two strips at the end of the extrusion with respectively at one or each side end of the strip a hollow tubular structure.
Figure 5:
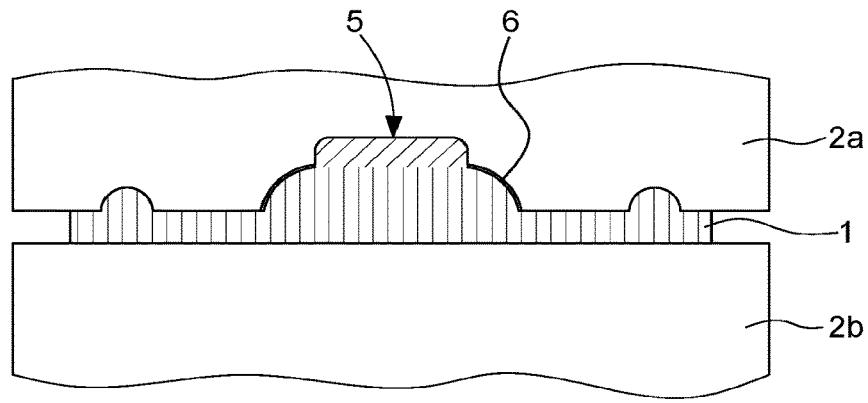
FIG. 5 shows a partial sectional view along the same plane A-A of another variant of the marking device.

According to another variant, one of the rollers includes one or more notches of a width less than that of the strip. Such examples are illustrated in FIGS. 3 and 5. In FIG. 3, one of the rollers, the upper roller 2a with the impression 5 in the illustrated example, includes two notches 6 respectively on either side of the impression 5. During marking, the deformable material is positioned in the notches 6 and ensures maintaining the substrate 1. This material in the notches forms either lost material intended to be cut, or a raised area which is maintained on the final object. Thus, FIG. 5 shows a configuration with a single notch 6 disposed opposite the impression 5 on the same roller 2a. The material filling the notch forms a relief which is maintained on the final object. It is also possible to position the notch opposite the impression on the other roller. It is also considerable that one or both notches has a shape corresponding to a relief of the substrate resulting from the extrusion. Thus, in the case of a wristlet, the strip resulting from the extrusion can have a width corresponding to the length of one strand or both strands of the wristlet. Reference is made to the EP application for this embodiment. As illustrated in FIG. 4, the extruded strip 1 includes at one or each of its side ends a protruding hollow tubular structure 7. The hollow tubular structures form through holes intended to receive respectively a bar allowing to hook the horns of a watch case or a buckle.

In addition to the notch/notches having a shape complementary to the reliefs present on the extruded strip, the roller(s) may have a profile adapted to variations in thickness of the strip obtained from the extrusion die so as to maintain the profile at the output of the marking device.

According to the invention, the synthetic materials used during the extrusion are mixtures comprising at least one thermoplastic polymer. Preferably, the mixture comprises at least one thermoplastic elastomer (TPE) selected from the following list:
  TPE-O—Thermoplastic olefins
  TPE-S—SBS, SEBS or SEPS styrene compound
  TPE-V—Vulcanised PP/EPDM compound
  TPE-E—Copolyester compound
  TPE-U—Thermoplastic polyurethane
  TPE-A—Thermoplastic polyamide.

Figure 6:
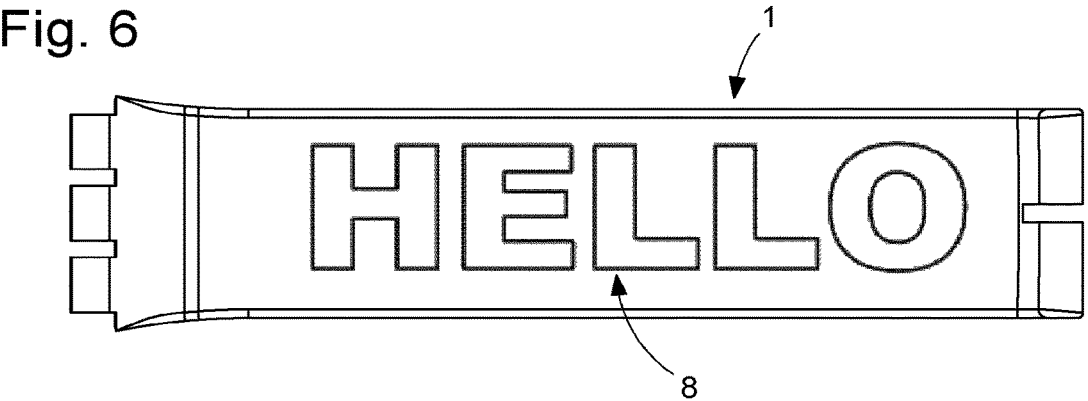
FIG. 6 shows a wristlet strand extruded and marked according to the method of the invention.

The method proceeds as follows. The strip is extruded through the extrusion die. Then it passes through the cooling means so as to freeze the dimensions of the profile while maintaining a deformable material capable of being marked and, where appropriate, capable of filling the notch/notches. At the output of the cooling means, the material typically has a temperature of the order of 50-80° C. As an example, for a TPE-S strip, the material has a temperature of 180° C. at the output of the extrusion die and a temperature of 70° C. at the output of the cooling means. The extruded strip which is still hot then passes between the two rollers of the marking device. The pattern or texture of one of the rollers is then transferred to the strip. The marking depth is controlled by the pressure imposed between the two rollers and the engraving of the roller. The marked substrate is then sized using a mechanical stamping tool, by water jet, laser or ultrasound cutting to obtain the decorative article. As an example, a wristlet strand extruded and marked with the method according to the invention is shown in FIG. 6.

Legend
  (1) Substrate or extruded strip
  (2) Marking device
    a. Upper roller
    b. Lower roller
  (3) Extrusion die
  (4) Cooling means
  (5) Impression
  (6) Notch
  (7) Protruding hollow tubular structure
  (8) Marking

The invention claimed is:
1. An in-line method for marking a substrate made of extruded synthetic material, said method comprising:
  extruding the synthetic material through an extrusion die to form the substrate, and
  marking said substrate by scrolling the substrate obtained from the extrusion die between two rotatably mounted and temperature-controlled rollers with an upper roller and a lower roller, one of said rollers having an impression forming a negative of a decoration to be marked on one face of the substrate, said one of said rollers or the other of said rollers including at least one notch configured to guide the substrate as the substrate passes through the extrusion die and between the two rollers, wherein
  the impression is disposed in a concave portion of the one roller,
  the impression and the at least one notch are disposed on the one roller,
  the impression is placed in between two notches of the at least one notch, and
  wherein the decoration includes letters, numbers, or a drawing.

2. The method according to claim 1, further comprising forced cooling between the extruding and the marking, said substrate having a temperature greater than or equal to 50° C. at an end of the forced cooling.

3. The method according to claim 1, further comprising after the marking, sizing the substrate to produce a decorative article.

4. The method according to claim 1, wherein the two notches of the at least one notch have a width less than the width of the substrate.

5. The method according to claim 4, wherein the two notches of the at least one notch have a shape complementary to a relief present on the substrate obtained from the extrusion die.

6. The method according to claim 5, wherein the substrate is intended to produce a wristlet of a watch or a piece of jewelry and in that the two notches of the at least one notch have a shape complementary to a hollow tubular structure of the substrate, a recess of the hollow tubular structure forming a through hole intended to receive a bar allowing to hook horns of a watch case or a buckle.

7. The method according to claim 1, wherein said two notches of the at least one notch have a shape complementary to two hollow tubular structures of the substrate.

8. An in-line method for marking a substrate made of extruded synthetic material, comprising:
    extruding the synthetic material through an extrusion die to form the substrate, and
    marking the substrate by scrolling the substrate obtained from the extrusion die between two rotatably mounted and temperature-controlled rollers with an upper roller and a lower roller, one of the rollers having an impression forming a negative of a decoration to be marked on one face of the substrate, said one of said rollers or the other of said rollers including at least one notch configured to guide the substrate as the substrate passes through the extrusion die and between the two rollers, wherein
    the impression is disposed in a concave portion of the one roller,
    the impression and the at least one notch are disposed on the same roller, and
    the impression is placed in between two notches of the at least one notch each having a curved concave shape in an axial direction of the one roller.

9. The method according to claim 8, wherein the decoration includes letters, numbers, or a drawing.

10. An in-line method for marking a substrate made of extruded synthetic material, comprising:
    extruding the synthetic material through an extrusion die to form the substrate, and
    marking the substrate by scrolling the substrate obtained from the extrusion die between first and second rotatably mounted and temperature-controlled rollers, the first and second rollers having respective first and second planar faces, the first and second planar faces opposing each other,
    wherein the first roller has, in the first planar face:
        an impression forming a negative of a decoration to be marked on one face of the substrate, being a separate structure from the first roller, and having an outer surface configured to mark the substrate being parallel to, and recessed from or flush with, the first planar face, and
        at least one guide notch separated from the impression and configured to guide the substrate as the substrate passes through the extrusion die and between the two rollers; and
    the second planar face has no notch or impression.

11. The method according to claim 10, wherein the first roller comprises a first notch, the impression being disposed in the first notch.

12. The method according to claim 11, wherein the at least one guide notch comprises two guide notches and the first notch is disposed between the two guide notches.

13. The method according to claim 12, wherein the impression has a concave shape and the first notch has a concave shape.

14. The method according to claim 10, wherein the decoration includes letters, numbers, or a drawing.

15. An in-line method for marking a substrate made of extruded synthetic material, said method comprising:
    extruding the synthetic material through an extrusion die to form the substrate, and
    marking said substrate by scrolling the substrate obtained from the extrusion die between two rotatably mounted and temperature-controlled rollers with an upper roller and a lower roller, one of said rollers having an impression forming a negative of a decorative texture to be marked on one face of the substrate, said one of said rollers or the other of said rollers including at least one notch configured to guide the substrate as it passes through the extrusion die and between the two rollers, wherein
    the impression and the at least one notch are disposed on the same roller,
    the impression is connected to and placed in between two notches of the at least one notch, and
    the two notches of the at least one notch have a shape complementary to a hollow tubular structure of the substrate, a recess of the hollow tubular structure forming a through hole configured to receive a bar allowing to hook horns of a watch case or a buckle.

16. The method according to claim 15, wherein the decoration includes letters, numbers, or a drawing.

* * * * *